(12) United States Patent
Derrien et al.

(10) Patent No.: US 11,090,854 B2
(45) Date of Patent: Aug. 17, 2021

(54) METHOD AND MOLDING UNIT FOR PRODUCING CONTAINERS WITH LONG BOXING TRAVEL

(71) Applicant: SIDEL PARTICIPATIONS, Octeville sur Mer (FR)

(72) Inventors: Mikael Derrien, Octeville sur Mer (FR); Pierrick Protais, Octeville sur Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 34 days.

(21) Appl. No.: 15/301,284

(22) PCT Filed: Feb. 5, 2015

(86) PCT No.: PCT/FR2015/050273
§ 371 (c)(1),
(2) Date: Sep. 30, 2016

(87) PCT Pub. No.: WO2015/150648
PCT Pub. Date: Oct. 8, 2015

(65) Prior Publication Data
US 2017/0021550 A1   Jan. 26, 2017

(30) Foreign Application Priority Data

Apr. 2, 2014 (FR) .................................... 14 52916

(51) Int. Cl.
*B29C 49/06* (2006.01)
*B29C 49/12* (2006.01)
(Continued)

(52) U.S. Cl.
CPC .............. *B29C 49/06* (2013.01); *B29C 49/12* (2013.01); *B29C 49/4823* (2013.01);
(Continued)

(58) Field of Classification Search
None
See application file for complete search history.

(56) References Cited

U.S. PATENT DOCUMENTS 3,949,034 A * 4/1976 Uhlig ...................... B29C 49/16
264/530
4,465,199 A * 8/1984 Aoki ...................... B29C 49/12
215/373
(Continued)

FOREIGN PATENT DOCUMENTS

EP   2 626 190 A1   8/2013
FR   2 966 374 A1   4/2012
(Continued)

OTHER PUBLICATIONS

International Search Report, dated Apr. 21, 2015, from corresponding PCT Application.

*Primary Examiner* — Monica A Huson

(57) ABSTRACT

A method of producing a container (2) from a blank (3) made of plastics material within a mould (4) which is provided with a wall (5) defining a cavity (6) bearing the impression of the container (2), and with a mould base (8) which can move relative to the wall (5) between a retracted position in which it extends in set-back manner relative to the cavity (6) and a deployed position in which it closes the cavity (6). The method includes a boxing stage in which the mould base (8) moves from its retracted position to its deployed position, the travel (C) of the mould base (8) between its retracted position and its deployed position being greater than 20 mm.

18 Claims, 5 Drawing Sheets

(51) Int. Cl.
  *B29C 49/78* (2006.01)
  *B29C 49/54* (2006.01)
  *B29C 49/48* (2006.01)
  B29K 67/00 (2006.01)
  B29L 31/00 (2006.01)

(52) U.S. Cl.
  CPC .......... *B29C 49/541* (2013.01); *B29C 49/783* (2013.01); *B29C 2049/4825* (2013.01); *B29C 2049/4843* (2013.01); *B29C 2049/4892* (2013.01); *B29K 2067/003* (2013.01); *B29L 2031/712* (2013.01)

(56) References Cited

U.S. PATENT DOCUMENTS

| | | | |
|---|---|---|---|
| 4,769,206 A * | 9/1988 | Reymann | B29C 49/541 264/534 |
| 8,431,068 B2 * | 4/2013 | Hansen | B29C 49/4817 264/534 |
| 8,636,944 B2 * | 1/2014 | Kelley | B29C 49/4802 264/523 |
| 9,969,517 B2 * | 5/2018 | Melrose | B65B 61/24 |
| 2011/0204067 A1 | 8/2011 | Schneider et al. | |
| 2012/0031916 A1 * | 2/2012 | Derrien | B29C 49/48 220/675 |
| 2013/0224325 A1 | 8/2013 | Langlois | |
| 2014/0145378 A1 | 5/2014 | Deau et al. | |

FOREIGN PATENT DOCUMENTS

| | | |
|---|---|---|
| FR | 2 975 332 A1 | 11/2012 |
| WO | 2012/156638 A1 | 11/2012 |

* cited by examiner

METHOD AND MOLDING UNIT FOR PRODUCING CONTAINERS WITH LONG BOXING TRAVEL

The invention relates to the manufacturing of containers by blow molding parisons made of plastic material, such as polyethylene terephthalate (PET).

Ordinarily, a container comprises a body, a base closing the body at a lower end of the latter, and a neck that opens at an upper end of the body to make possible the filling and draining of the container.

A conventional technique for manufacturing containers is blow molding (optionally paired with stretching by means of a sliding rod). This technique consists in inserting the parison (i.e., a preform or an intermediate container that has undergone a preforming operation), previously heated at a temperature that is higher than the glass transition temperature of the material (approximately 80° C. in the case of PET), in a mold that is equipped with a wall that defines a cavity bearing the impression of the container, and in injecting into the parison, by the neck, a fluid, such as a gas (generally air) that is pressurized for flattening the material against the wall of the mold.

For certain applications, it is known to form the container in a mold that is equipped with a mold base that can move in relation to the wall between a retracted position in which the mold base is retracted in relation to the cavity and a deployed position in which the mold base closes the cavity. Initially in the retracted position, the mold base is moved toward its deployed position during the forming of the container.

This technique, called boxing and described in detail in the French patent application FR 2 975 332 (Sidel Participations) or its international equivalent WO 2012/156638, makes it possible to increase the stretching rate of the material and has the dual advantage of structurally reinforcing the base and improving the impression-taking of the former.

This technique, however, is difficult to implement because it is based on estimates as to the instantaneous state of the container during forming, based in particular on the heating temperature of the preform, the pressure of the injected fluid, and, if necessary, the instantaneous position of the stretching rod. A premature initiation of the boxing limits the stretching of the material and reduces the advantages of this technique. In contrast, a delayed initiation gives rise to a risk of pinching the material in the interface between the wall of the mold and the mold base, likely to create on the base of the container a bead of material that is unsightly and detrimental to the strength of the container.

The above-mentioned document FR 2 975 332 proposes initiating the boxing operation before the blow-molding operation. This technique, of course, makes it possible to minimize the risks of pinching the material, but it is likely, in some cases (in particular for the bases with complex shapes), to cause an imperfect impression-taking.

One objective is consequently to propose a solution that makes it possible to improve the impression-taking of the bases of the containers, in particular with a complex shape.

For this purpose, in the first place, a method for manufacturing a container from a parison made of plastic material, within a mold that is equipped with a wall that defines a cavity bearing the impression of the container, and a mold base that can move in relation to the wall between a retracted position in which it extends retracted in relation to the cavity, and a deployed position in which it closes the cavity, is proposed, with this method comprising:

A phase for inserting the parison into the mold;

A pre-blow-molding phase comprising the injection into the parison of a pressurized fluid at a so-called pre-blow-molding pressure;

A blow-molding phase, following the pre-blow-molding phase, and comprising the injection into the parison of a pressurized fluid at a so-called blow-molding pressure that is higher than the pre-blow-molding pressure;

A boxing phase comprising the movement of the mold base from its retracted position toward its deployed position, with the travel of the mold base between its retracted position and its deployed position being greater than 20 mm.

The result is a better impression-taking of the base and a higher stretching rate, enhancing the appearance and the structural rigidity of the container.

Various additional characteristics of this method can be provided, by themselves or in combination:

The boxing phase is initiated before the blow-molding phase;

The travel of the mold base is less than or equal to 60 mm.

Secondly, a molding unit is proposed for the manufacturing of a container from a parison made of plastic material, with this molding unit comprising:

A mold that is equipped with a wall that defines a cavity bearing the impression of the container, and a mold base that can move in relation to the wall between a retracted position in which it extends retracted in relation to the cavity, and a deployed position in which it closes the cavity;

A lower end-of-travel stop that defines the retracted position of the mold base, and an upper end-of travel stop that defines the deployed position of the mold base, with the travel of the mold base defined by the stops being greater than 20 mm.

Various characteristics of the mold unit can be provided, by themselves or in combination:

The molding unit comprises a jack equipped with a jack body, a piston, and a rod that is integral with the piston, and on which is mounted the mold base, with the rod and the piston being integrally able to move in relation to the jack body between a retracted position corresponding to the retracted position of the mold base, and a deployed position corresponding to the deployed position of the mold base;

The lower stop is arranged opposite a lower support surface of the mold base, to ensure contact with the former in a retracted position;

The lower stop is formed beside an outer surface of an upper wall of the jack body;

The upper stop is arranged opposite the piston, to ensure contact with the latter in the deployed position;

The upper stop is formed beside an inner surface of an upper wall of the jack body;

The travel of the mold base between the stops is less than or equal to 60 mm.

Other objects and advantages of the invention will become evident from the description of an embodiment, given below with reference to the accompanying drawings, in which.

Figure 5:
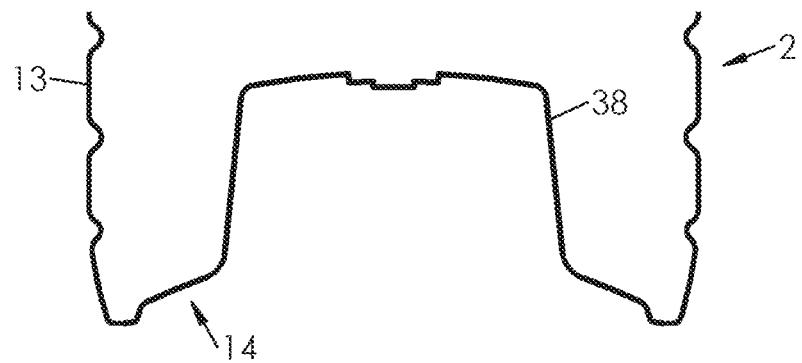
Figure 6:
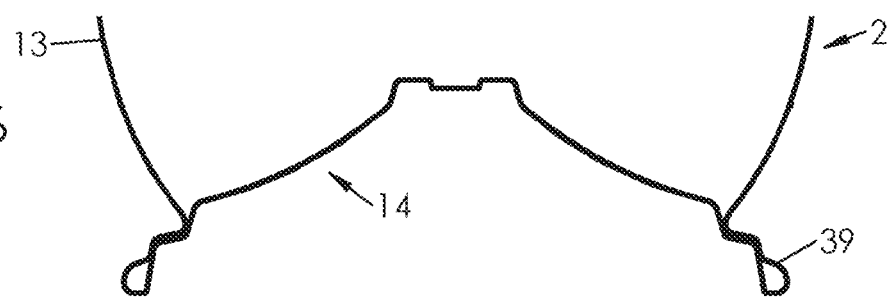
Figure 7:
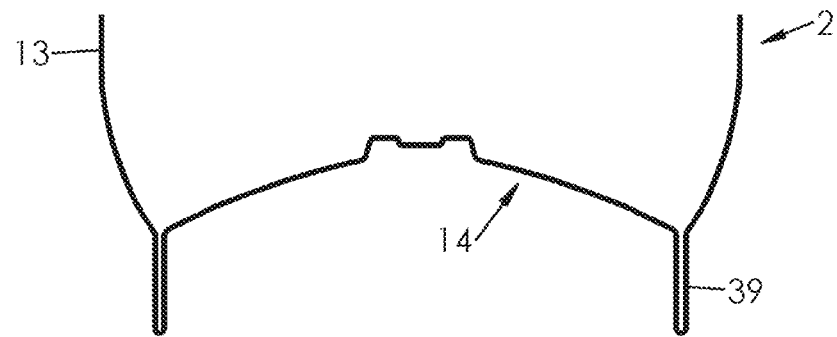

FIGS. 5, 6, and 7 are cross-sections showing three bases of containers of different shapes.

Figure 1:
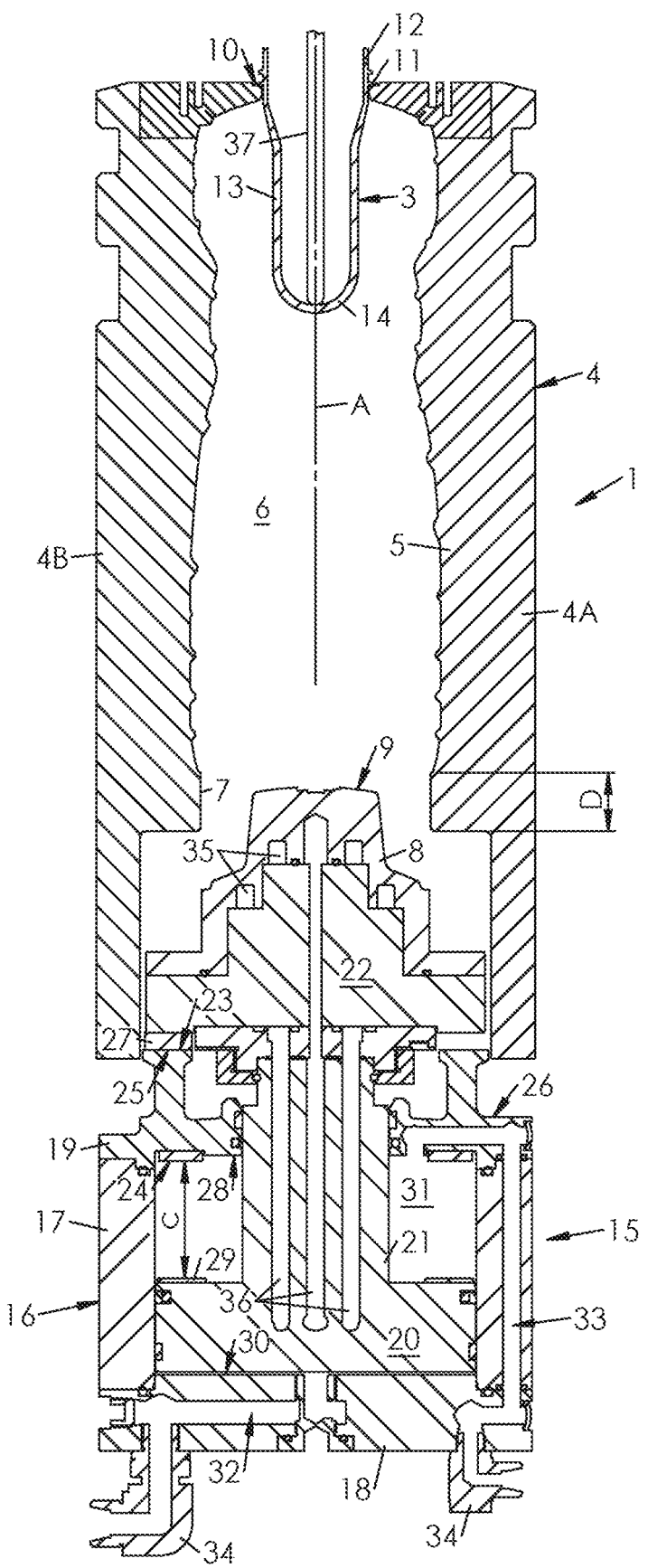
FIG. 1 is a cross-section of a molding unit, in the retracted position of the mold base.
Figure 2:
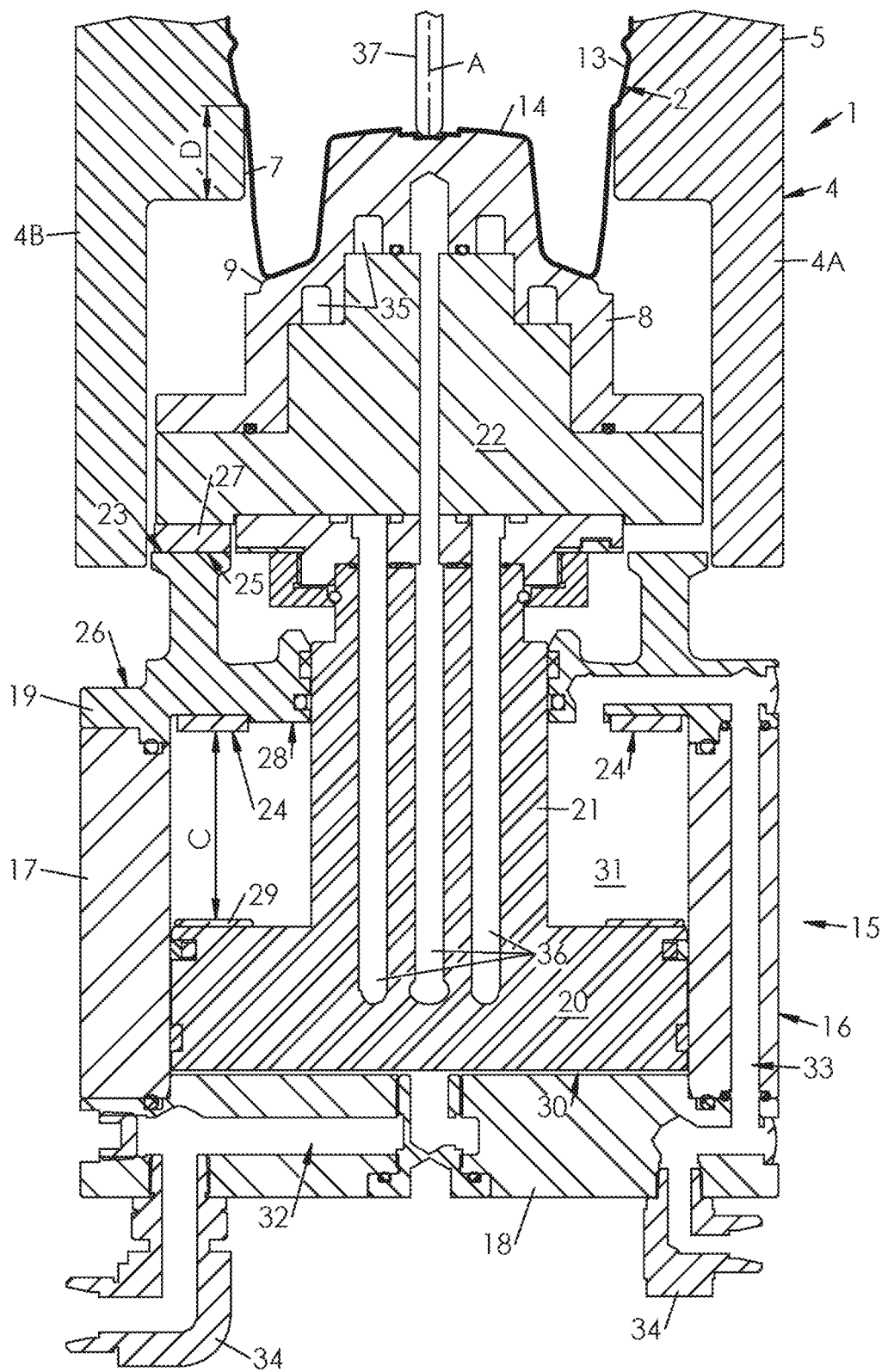
FIG. 2 is a detail cross-section, on an enlarged scale, of the molding unit of FIG. 1, in the retracted position of the mold base.
Figure 3:
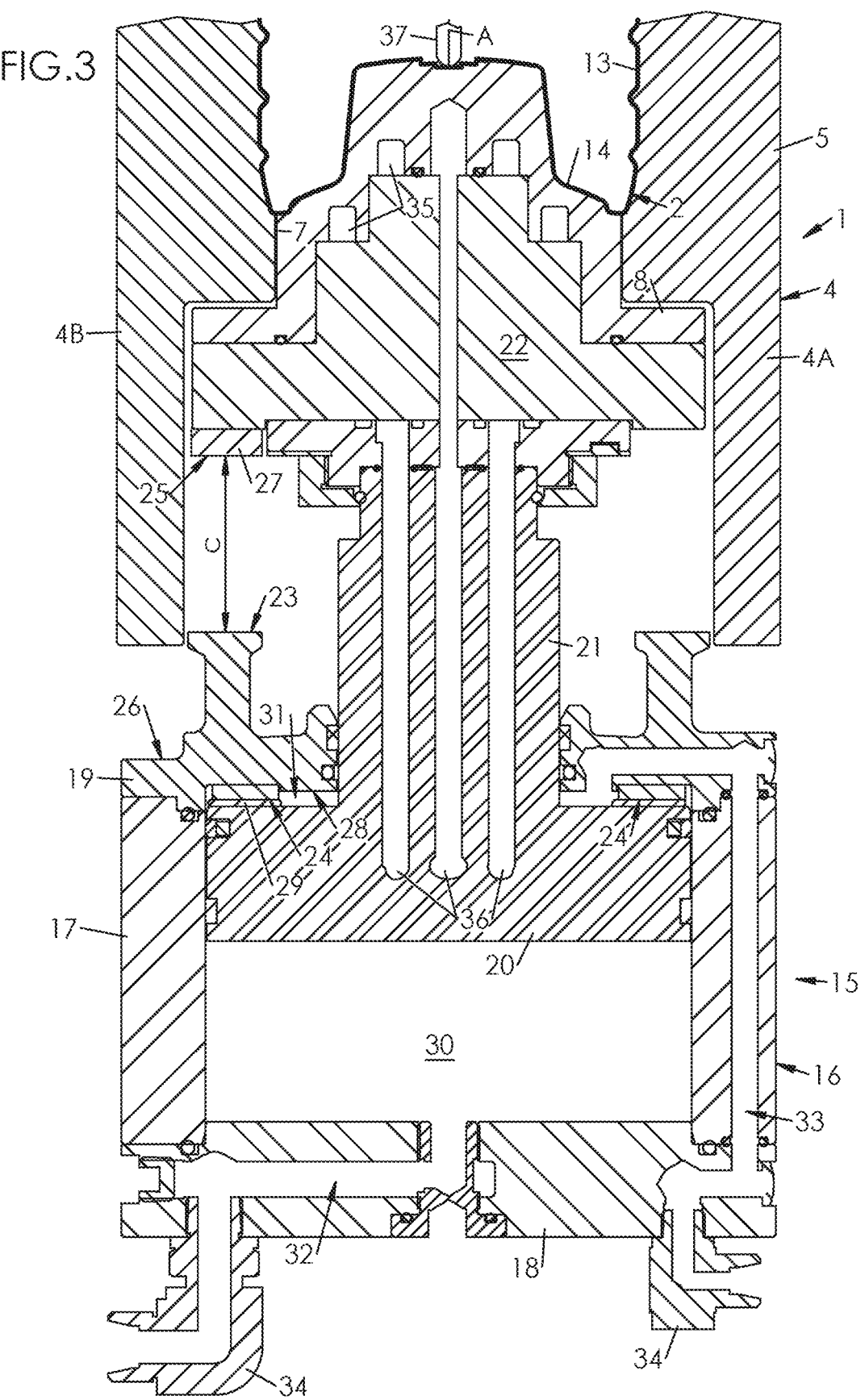
FIG. 3 is a view that is similar to FIG. 2, showing the molding unit in the deployed position of the mold base.

FIGS. 1 to 3 show a molding unit 1 for the manufacturing of a container 2 by blow molding (or stretch blow molding) starting from a parison 3 (in practice, this is a preform, obtained by injection) made of plastic material.

The molding unit 1 comprises, firstly, a mold 4.

This mold 4 comprises a wall 5 that is formed by two articulated half-molds 4A, 4B, defining an inner cavity 6 that is distributed around a main axis A of the mold 4 that, when the containers 2 to be formed are symmetrical in revolution, forms an axis of symmetry of the mold 4.

The cavity 6 partially defines an impression for a side wall or body of the container 2. The wall 5 has, in a lower part, an opening 7 that defines a passage for a mold base 8 that is mounted to move in relation to the wall 5 between a retracted (or lower) position, illustrated in FIGS. 1 and 2, in which the mold base 8 is separated from the opening 7 (and therefore extends retracted in relation to the cavity 6) downward, and a deployed (or upper) position, illustrated in FIG. 3, in which the mold base 8 blocks the opening 7.

The mold base 8 has an upper surface 9 that defines an impression for a base of the container 2. In the upper position, the mold base 8 closes the cavity 5, thus completing the impression of the container 2, against which the material is applied during the blow molding. "Travel" of the mold base, denoted C in FIG. 2, is what the distance separating its lower position from its upper position is called. As we will see below, this travel is greater than (preferably strictly) 20 mm. According to a particular embodiment, this travel C is also less than (or equal to) 60 mm, and even less than or equal to 40 mm.

The parison 3 and then the container 2 formed from the former rest on an upper surface 10 of the mold 4 by means of a collar 11 of the parison 3 (or of the container 2), which delimits a neck 12 of the parison 3 (or of the container 2), held outside of the mold 4.

Under the collar 11, the parison 3 (and then the container 2) has a body 13, which extends overall in the axial direction, and a base 14, which is first of all hemispherical (FIG. 1), and then, once formed against the mold base 8 (FIG. 3), extends overall in the radial direction starting from a lower end of the body 13.

The molding unit comprises, secondly, a jack 15 for control of the position of the mold base 8 and that comprises a jack body 16 equipped with a cylindrical jacket 17, a lower wall 18, and an upper wall 19 closing the jacket at each of its ends, and a piston 20 that is mounted to slide in the jacket between the walls.

As FIGS. 2 and 3 show, the piston 20 is integral with a rod 21 that passes through, in a fluid-tight manner, the upper wall 19 through a complementary opening made in the former.

The mold base 8 is mounted on the rod 21, at an upper end of the former that projects outside of the jack body 16, by means of a stand 22. The attachment of the mold base 8 on the stand 22 (the same as that of the stand 22 on the rod 21) can be done in a conventional manner, for example by screwing.

The piston 20 and the rod 21 can move integrally in relation to the jack body 16 between a retracted position, corresponding to the retracted position of the mold base 8 (FIG. 2), and a deployed position, corresponding to the deployed position of the mold base 8 (FIG. 3).

The molding unit comprises, thirdly, two stops that define the end positions of the mold base 8, namely:

A lower end-of-travel stop 23 that defines the retracted position of the mold base 8, and An upper end-of-travel stop 24 that defines the deployed position of the mold base 8.

The stops 23, 24 can be arranged to come into contact directly with the mold base 8, or else with the piston 20.

According to an embodiment, the lower stop 23 is arranged opposite a lower support surface 25 of the mold base 8, to ensure contact with the former in the retracted position.

Thus, in the example illustrated, the lower stop 23 is formed beside an outer surface 26 of the upper wall 19. More specifically, as illustrated in FIG. 2, the lower stop 23 is formed by an axial end surface with an annular ring that is formed projecting over the upper wall 19 from the outer surface 26 of the former.

As FIG. 3 shows, the lower support surface 25 of the mold base 8 can be formed by one or more connected buffers 27, which can, in addition to the stop function, produce a damping function contributing to the quiet running of the molding unit 1.

Furthermore, the upper stop 24 can be arranged opposite the piston 20, to ensure contact with the former in the deployed position.

Thus, in the example illustrated, the upper stop 24 is formed beside an inner surface 28 of the upper wall 19. More specifically, as illustrated in FIG. 3, the upper stop 24 is formed by an annular shim that is integral with the upper wall 19. To limit the wear and tear of the piston 20 upon contact with the upper stop 24, the former can carry a washer 29 that is applied against the upper stop 24 in the deployed position.

As FIGS. 2 and 3 show, the piston 20 divides the body 16 into two fluid chambers, namely a lower chamber 30, delimited by the piston 20 and the lower wall 18, and an upper chamber 31, delimited by the piston 20 and the upper wall 19.

The movement of the piston 20 is controlled by a fluid control circuit comprising:

a drive pipe 32 connected to a pressurized fluid source (air, water, oil, etc.) by means of a solenoid valve and emptying into the lower chamber 30, and a return pipe 33 connected to the pressurized fluid source by means of a solenoid valve and emptying into the upper chamber 31.

As FIGS. 2 and 3 clearly show, the drive pipe 32 is partially formed in the lower wall 18; as for the return pipe 33, it is partially formed in the lower wall 18, in the jacket 17, and in the upper wall 19. The connection of the pipes 32, 33 to fluid intake tubes can be done, as in the example illustrated, by means of connectors 34 that are connected and screwed onto the lower wall 18.

The temperature of the mold base 8 can advantageously be regulated by circulation of a coolant in a thermal regulation circuit 35 formed partially in the base 8. As FIGS. 2 and 3 show, pipes 36 for supplying and discharging coolant can be formed in the stand 22, the rod 21, and the piston 20.

To manufacture the container 2 from a parison 3, the procedure is as follows.

With the mold 4 being in its configuration illustrated in FIGS. 1 and 2, with the mold base 8 in its lower position, the parison 3, previously heated to a temperature that is higher than the glass transition temperature of the material (approximately 80° C. in the case of the PET), is introduced therein.

Then, a stretching rod 37 that can move in the axial direction is inserted into the parison 3, by its neck 12; as soon as the rod 37 reaches the base 14 of the parison 3, the pre-blow molding is initiated by injecting a fluid (in particular air) into the parison 3 at a pre-blow-molding pressure P1 (less than 15 bars, and, for example, on the order of 7 to 12 bars).

The stretching speed and the air flow rate are such that the stretching rod 37 remains in contact with the base 14 of the parison 3 throughout the pre-blow molding.

When the stretching rod 37 reaches the mold base 8 by flattening there the base 14 of the container being formed (FIG. 3), the mold base 8 is always in its lower position.

The pre-blow-molding pressure P1 is not enough to flatten the material tightly against the wall 5 of the mold 4, and it is necessary to inject into the container 2 being formed a blow-molding pressure P2 that is higher than the pre-blow-molding pressure P1 (in practice, the blow-molding pressure P2 is greater than or equal to 15 bars, and, for example, on the order of 20 to 30 bars).

There then occurs an abrupt rise in pressure in the parison 3 until this pressure is equal to the blow-molding pressure P2. After a predetermined period of maintaining the blow-molding pressure P2 in the thus formed container 2, the former is depressurized before it is drained.

An operation for raising the mold base 8, referred to as boxing, is initiated before the blow-molding operation, in such a way as to impart to the material of the base 14 an increased deformation rate that is favorable to the orientation of the molecules (and therefore to the rigidity) and to the impression-taking on the upper surface 9 of the mold base 8.

Figure 4:
FIG. 4 is a diagram that comprises two curves that respectively illustrate the variations of pressure in the container during forming in the molding unit and the corresponding position of the mold base.

FIG. 4 shows the curves that represent, based on time, denoted t:

At the bottom, the axial position (or height), denoted Z, of the mold base 8, by taking the retracted position as the origin (Z=0);

At the top, the pressure, denoted P, prevailing in the parison 3 (or the container 2) during forming.

The curves are synchronized on the time axis that is common to them, with the horizontal dotted lines making it possible to situate the values P1, P2 of the pre-blow-molding and blow-molding pressures mentioned, as well as the end positions (Z=0, Z=C) of the mold base 8, with the vertical dotted line making it possible to carry out a matching of the curves to an instant in time, denoted t0, when the boxing is initiated.

As we have seen, the travel C is greater than 20 mm. This travel, which is significant, makes it possible for the material to be deployed beyond the limits of the cavity 6 during the pre-blow-molding phase, as illustrated in FIG. 2, and therefore to make possible a good impression-taking of the base 14, in particular when the former has a complex shape.

FIGS. 5, 6, and 7 show three bases 14 of containers (cutaway views) that each illustrate differently the concept of complexity mentioned above.

The base 14 of FIG. 5, similar to the one that is seen in FIG. 3 within the mold 4, thus has a central piece 38 of great height (in relation to the diameter of the base 14) that is designed to allow, for example, the stacking of the container 2 by accommodating the neck of a similar underlying container 2.

The bases 14 of FIGS. 6 and 7 each comprise a seat 39 projecting from a lower end of the body 13. The seat 39 shown in FIG. 6 has folds; the seat 39 shown in FIG. 7 is narrow and has a significant axial extension in relation to the diameter of the base 14.

The tests demonstrate that these bases 14 are better formed by the method described above than by an ordinary method in which the boxing travel is less than 20 mm. Thus, this method makes it possible to improve the impression-taking at least of the bases that are equipped with a central piece and/or a narrow seat and great height.

In a subsidiary manner, the significant travel C makes it possible to obtain in the constituent material of the base 14 a significant stretching rate that is favorable to the final structural rigidity of the base 14.

The risks of pinching the material between the wall 5 and the mold base 8 are limited by initiating the boxing before initiating the blow molding. In addition, the opening 7 preferably has a relatively significant axial extension D (greater than or equal to 20 mm), which also contributes to limiting the pinching risks.

When the boxing is carried out in such a way that the mold base 8 reaches its upper position before the end of the blow molding, the speed of motion of the mold base 8 is essentially constant during the entire boxing, which indicates the almost linear nature of the variable cross-section of the curve that illustrates the position Z of the mold base 8.

Furthermore, experience shows that the benefits of long travel C from the mold base 8 reach a plateau starting from 60 mm, hence the proposal of this upper limit.

The invention claimed is:

1. A method for manufacturing a container (2) from a parison (3) made of plastic material, within a mold (4) that is equipped with a wall (5) that defines a cavity (6) bearing the impression of the container (2), and a mold base (8) that can move in relation to the wall (5) between a retracted position in which it extends retracted in relation to the cavity (6), and a deployed position in which it closes the cavity (6), and the wall (5) having at a lower part an opening (7) that defines a passage for the mold base (8), the method comprising:
   a phase for inserting the parison (3) into the mold (4);
   a pre-blow-molding phase comprising the injection into the parison (3) of a pressurized fluid at a so-called pre-blow-molding pressure (P1), thus causing the plastic material to extend beyond the cavity (6) in an axial direction;
   a blow-molding phase, following the pre-blow-molding phase, and comprising the injection into the parison (3) of a pressurized fluid at a so-called blow-molding pressure (P2) that is higher than the pre-blow-molding pressure (P1); and
   a boxing phase comprising the movement of the mold base (8) from the retracted position toward the deployed position, wherein the boxing phase is initiated before the blow-molding phase;
   wherein the travel (C) of the mold base (8) between the retracted position and the deployed position is greater than 20 mm and less than or equal to 60 mm; and
   wherein the opening (7) includes an axial extension (D) corresponding to the travel (C), the axial extension (D) being greater than or equal to 20 mm to allow the opening (7) to fully receive an upper surface (9) of the mold base (8) in the deployed position.

2. A molding unit (1) for manufacturing a container (2) from a parison (3) made of plastic material, the molding unit (1) comprising:
   a mold (4) that is equipped with a wall (5) that defines a cavity (6) bearing the impression of the container (2), the mold configured to allow the plastic material to extend beyond the cavity (6) in an axial direction during a pre-blowing operation, and a mold base (8)

that can move in relation to the wall (5) between a retracted position in which it extends retracted in relation to the cavity (6), the wall (5) having at a lower part an opening (7) that defines a passage for the mold base (8), and a deployed position in which it closes the cavity (6); and a lower end-of-travel stop (23) that defines the retracted position of the mold base (8), and an upper end-of travel stop (24) that defines the deployed position of the mold base (8);

wherein the travel (C) of the mold base (8) defined by the stops (23, 24) is greater than 20 mm and less than or equal to 60 mm; and wherein the opening (7) includes an axial extension (D) corresponding to the travel (C), the axial extension (D) being greater than or equal to 20 mm to allow the opening (7) to fully receive an upper surface (9) of the mold base (8) in the deployed position.

3. The molding unit (1) according to claim 2, further comprising a jack (15) equipped with a jack body (16), a piston (20), and a rod (21) that is integral with the piston (20), and on which is mounted the mold base (8), with the rod (21) and the piston (20) being integrally able to move in relation to the jack body (16) between a retracted position corresponding to the retracted position of the mold base (8), and a deployed position corresponding to the deployed position of the mold base (8).

4. The molding unit (1) according to claim 3, wherein the lower stop (23) is arranged opposite a lower support surface (25) of the mold base (8) to ensure contact with the former in the retracted position.

5. The molding unit (1) according to claim 4, wherein the lower stop (23) is formed beside an outer surface (26) of an upper wall (19) of the jack body (16).

6. The molding unit (1) according to claim 3, wherein the upper stop (24) is arranged opposite the piston (20) to ensure contact with the former in the deployed position.

7. The molding unit (1) according to claim 6, wherein the upper stop (24) is formed beside an inner surface (28) of an upper wall (19) of the jack body (16).

8. The molding unit (1) according to claim 2, wherein the travel (C) of the mold base (8) between the stops (23, 24) is greater than 40 mm and less than or equal to 60 mm.

9. The method according to claim 1, wherein the travel (C) of the mold base is greater than 40 mm and less than or equal to 60 mm.

10. The molding unit (1) according to claim 4, wherein the upper stop (24) is arranged opposite the piston (20) to ensure contact with the former in the deployed position.

11. The molding unit (1) according to claim 5, wherein the upper stop (24) is arranged opposite the piston (20) to ensure contact with the former in the deployed position.

12. The molding unit (1) according to claim 3, wherein the travel (C) of the mold base (8) between the stops (23, 24) is greater than 40 mm and less than or equal to 60 mm.

13. The molding unit (1) according to claim 4, wherein the travel (C) of the mold base (8) between the stops (23, 24) is greater than 40 mm and less than or equal to 60 mm.

14. The molding unit (1) according to claim 5, wherein the travel (C) of the mold base (8) between the stops (23, 24) is greater than 40 mm and less than or equal to 60 mm.

15. The molding unit (1) according to claim 2, wherein the travel (C) of the mold base (8) between the stops (23, 24) is equal to 60 mm.

16. The molding unit (1) according to claim 2, wherein the travel (C) of the mold base (8) between the stops (23, 24) is equal to 40 mm.

17. The method according to claim 1, wherein the travel (C) of the mold base is equal to 60 mm.

18. The method according to claim 1, wherein the travel (C) of the mold base is equal to 40 mm.

* * * * *